United States Patent
Murata et al.

(10) Patent No.: US 12,524,334 B2
(45) Date of Patent: Jan. 13, 2026

(54) ANALYSIS DEVICE AND ANALYSIS METHOD

(71) Applicant: Hitachi Astemo, Ltd., Hitachinaka (JP)

(72) Inventors: Daijiro Murata, Tokyo (JP); Masanori Kaneko, Tokyo (JP); Daisuke Shimbara, Tokyo (JP); Naoto Hasegawa, Hitachinaka (JP); Akiharu Sato, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 294 days.

(21) Appl. No.: 18/564,824

(22) PCT Filed: Feb. 18, 2022

(86) PCT No.: PCT/JP2022/006786
§ 371 (c)(1),
(2) Date: Nov. 28, 2023

(87) PCT Pub. No.: WO2023/276253
PCT Pub. Date: Jan. 5, 2023

(65) Prior Publication Data
US 2024/0289263 A1    Aug. 29, 2024

(30) Foreign Application Priority Data
Jun. 28, 2021   (JP) ................. 2021-107100

(51) Int. Cl.
*G06F 11/3668* (2025.01)
(52) U.S. Cl.
CPC .............. *G06F 11/3692* (2013.01)
(58) Field of Classification Search
None
See application file for complete search history.

(56) References Cited

U.S. PATENT DOCUMENTS

| | | | |
|---|---|---|---|
| 7,506,312 B1 * | 3/2009 | Girolami-Rose | G06F 8/71 717/124 |
| 2009/0265681 A1 * | 10/2009 | Beto | G06F 11/3688 717/100 |

(Continued)

FOREIGN PATENT DOCUMENTS

| | | | | |
|---|---|---|---|---|
| CN | 106649121 A | * | 5/2017 | .......... G06F 11/3692 |
| JP | 2014-142872 A | | 8/2014 | |

(Continued)

OTHER PUBLICATIONS

International Search Report (PCT/ISA/210) issued in PCT Application No. PCT/JP2022/006786 dated Apr. 5, 2022 with English translation (4 pages).

(Continued)

*Primary Examiner* — Philip Wang
(74) *Attorney, Agent, or Firm* — Crowell & Moring LLP

(57) ABSTRACT

An analysis device specifies a cause when a test of test target software fails in a test environment that is an environment for executing a test. In the test, execution of test target software and confirmation of an execution result are executed by a test script without human intervention. Test data is data read into the test target software and the test script when the test is executed. The analysis device includes: a score calculation unit that calculates a failure cause score for each of test target software, test data, a test script, and a test environment based on the presence or absence of a change; and an estimation unit that estimates, based on a failure cause score, whether the test has failed due to test target software, test data, a test script, or a test environment.

7 Claims, 25 Drawing Sheets

(56) References Cited

U.S. PATENT DOCUMENTS

| | | | |
|---|---|---|---|
| 2012/0278135 A1* | 11/2012 | Haber | G06Q 10/00 |
| | | | 705/7.38 |
| 2016/0275003 A1* | 9/2016 | Balakrishnan | G06F 11/3672 |
| 2017/0262360 A1* | 9/2017 | Kochura | G06F 40/279 |
| 2018/0307481 A1* | 10/2018 | Ganesan | G06F 8/70 |
| 2019/0340512 A1* | 11/2019 | Vidal | G06F 11/3692 |
| 2021/0064518 A1* | 3/2021 | Abu Taha | G06N 20/00 |
| 2024/0220403 A1* | 7/2024 | Shi | G06F 11/079 |

FOREIGN PATENT DOCUMENTS

| | | | | |
|---|---|---|---|---|
| JP | 2015-69615 A | | 4/2015 | |
| JP | 2016162282 A | * | 9/2016 | |
| JP | 2018-173703 A | | 11/2018 | |
| WO | WO-2020072701 A1 | * | 4/2020 | G06F 9/451 |

OTHER PUBLICATIONS

Japanese-language Written Opinion (PCT/ISA/237) issued in PCT Application No. PCT/JP2022/006786 dated Apr. 5, 2022 with English translation (7 pages).

\* cited by examiner

| CONFIGURATION INFORMATION | | | |
|---|---|---|---|
| TYPE | K1 | K2 | K3 |
| TEST TARGET SOFTWARE Src | INITIAL CALCULATION SOURCE CODE MAIN PROCESSING SOURCE CODE | INITIAL CALCULATION SOURCE CODE MAIN PROCESSING SOURCE CODE EXCEPTION PROCESSING SOURCE CODE | ·· |
| TEST DATA Dat | SAMPLE DATA | ABNORMAL-TIME DATA | ·· |
| TEST SCRIPT Ts | AUTOMATIC EXECUTION SCRIPT | AUTOMATIC EXECUTION SCRIPT AUXILIARY SCRIPT | ·· |
| TEST ENVIRONMENT Env | OS_typeW HW_typeW | OS_typeM HW_typeM | ·· |

| TEST CASE INFORMATION | | | | |
|---|---|---|---|---|
| TEST CASE ID | CONFIGURATION ID | | | |
|  | Src | Dat | Ts | Env |
| TC1 | K1 | K1 | K1 | K1 |
| TC2 | K2 | K1 | K1 | K1 |
| TC3 | K1 | K1 | K2 | K2 |
| · | · | · | · | · |

1011 (Test Case ID column), 1012 (Configuration ID columns)

FIG. 6

SCORE CALCULATION RULE INFORMATION (102)

| RULE ID (1021) | CONDITIONAL EXPRESSION (1022) | ADDITION VALUE (1023) | | | | USAGE FLAG (1024) |
|---|---|---|---|---|---|---|
| | | Ts | Dat | Src | Env | |
| R1 | IsChangedV(Ts_x, −1) = true | 0.7 | 0 | 0 | 0 | TRUE |
| R2 | IsChangedV(Src_x, −1) = true | 0 | 0 | 0.5 | 0 | TRUE |
| R3 | IsChangedV(Env_x, −1) = true | 0 | 0 | 0 | 0.7 | TRUE |
| R4 | IsChangedV(Dat_x, −1) = true | 0 | 0.5 | 0 | 0 | TRUE |
| . | . | . | . | . | . | . |

FIG. 7

CHANGE HISTORY INFORMATION (103)

| TYPE (1031) | CONFIGURATION ID (1032) | VERSION (1033) | CHANGE DATE (1034) |
|---|---|---|---|
| Ts | K1 | 1 | 4:5:32 JST FEB. 3, 2021 |
| | | 2 | 5:0:40 JST FEB. 4, 2021 |
| | | . | . |
| | K2 | 1 | 9:3:00 JST FEB. 9, 2021 |
| | | . | . |
| Dat | K1 | 1 | 4:5:32 JST FEB. 3, 2021 |
| | | 2 | 8:1:03 JST FEB. 12, 2021 |
| | | . | . |
| . | . | . | . |

| TEST EXECUTION ID (1041) | TEST CASE ID (1042) | TEST EXECUTION INFORMATION — CONFIGURATION ID AND VERSION (1043) | | | | PRIORITY (1044) | TEST STATE (1045) |
|---|---|---|---|---|---|---|---|
| | | Ts | Dat | Src | Env | | |
| E1 | TC1 | K1, V2 | K1, V1 | K1, V1 | K1, V1 | HIGH | FAILURE |
| E2 | TC1 | K1, V2 | K1, V1 | K1, V2 | K1, V1 | HIGH | FAILURE |
| E3 | TC2 | K2, V1 | K1, V1 | K1, V1 | K1, V1 | HIGH | NOT STARTED |
| ⋮ | ⋮ | ⋮ | ⋮ | ⋮ | ⋮ | ⋮ | ⋮ |

| TEST EXECUTION ID (1051) | FAILURE CAUSE SCORE (1052) | | | | RULE ID (1053) | | | | ESTIMATED FAILURE CAUSE (1054) |
|---|---|---|---|---|---|---|---|---|---|
| | Ts | Dat | Src | Env | Ts | Dat | Src | Env | |
| E1 | 0.7 | 0 | 0 | 0 | R1 | – | – | – | Ts |
| E2 | 0 | 0 | 0.5 | 0 | – | – | R2 | – | Src |
| ⋮ | ⋮ | ⋮ | ⋮ | ⋮ | ⋮ | ⋮ | ⋮ | ⋮ | ⋮ |

| NAME CORRESPONDENCE INFORMATION ||
|---|---|
| TYPE ID | FAILURE FACTOR TYPE |
| Ts | TEST SCRIPT |
| Dat | TEST DATA |
| Src | TEST TARGET SOFTWARE |
| Env | TEST ENVIRONMENT |

FIG. 11

TEST CASE ID: K1      TEST EXECUTION ID: E1

| FAILURE FACTOR | CONFIGURATION ID | VERSION | FAILURE CAUSE | SCORE | RULE ID |
|---|---|---|---|---|---|
| TEST SCRIPT | K1 | V1 | YES | 0.7 | R1 |
| TEST DATA | K1 | V1 | – | 0 | – |
| TEST TARGET SOFTWARE | K1 | V1 | – | 0 | – |
| TEST ENVIRONMENT | K1 | V1 | – | 0 | – |

| TEST CASE ID | TEST CASE INFORMATION ||||  CONFIRMATION |
|---|---|---|---|---|---|
| | CONFIGURATION ID |||||
| | Src | Dat | Ts | Env | |
| TC1 | K1 | K1 | K1 | K1 | AUTOMATIC |
| TC2 | K2 | K1 | K1 | K1 | MANUAL |
| TC3 | K1 | K1 | K2 | K2 | AUTOMATIC |
| . | . | . | . | . | . |

| RULE ID 1021 | CONDITIONAL EXPRESSION 1022 | SCORE CALCULATION EXTENSION RULE INFORMATION |||| DETAILED STATE 1025 | RELIABILITY 1026 | USAGE FLAG 1024 |
| --- | --- | --- | --- | --- | --- | --- | --- | --- |
| | | ADDITION VALUE 1023 |||| | | |
| | | Ts | Dat | Src | Env | | | |
| R1 | IsChangedV(Ts_x, -1) = true | 0.7 | 0 | 0 | 0 | COMPLETED | 1 | False |
| R2 | IsChangedV(TsIf_x, -1) = true | 0 | 0 | 0.5 | 0 | COMPLETED | 1 | True |
| R3 | IsChangedV(TsV_x, -1) = true | · | · | · | · | NOT DETAILED | 1 | · |
| · | · | · | · | · | · | · | · | · |
| R15 | IsChangedV(TsAIf_x, -1)= true && IsChangedV( SrcLogicDep_x, -1) = true | · | · | · | · | COMPLETED | · | · |
| R16 | IsChangedV(TsAIf_x, -1)= true && IsChangedV( SrcLogicDep_x, -1) = false | · | · | · | · | COMPLETED | · | · |
| · | · | · | · | · | · | · | · | · |

FIG. 18

| | ELEMENT DEFINITION INFORMATION | |
|---|---|---|
| TYPE | ELEMENT TYPE | CONFIGURATION NAME |
| Src | SrcIf | INTERFACE |
| | SrcV | CONSTANT/VARIABLE |
| | SrcLogic | PROCESSING LOGIC |
| | SrcCmt | COMMENT |
| | SrcComp | COMPONENT |
| Ts | TsIf | INTERFACE |
| | TsV | CONSTANT/VARIABLE |
| | TsLogic | PROCESSING LOGIC |
| | TsCmt | COMMENT |
| | TsAs | ASSERTION |
| Dat | DatSrcIf | FUNCTION INPUT PARAMETER |
| | DatV | INPUT VALUE |
| Env | EnvH | HARDWARE |
| | EnvSim | SIMULATOR |
| | EnvSft | SOFTWARE |

| ELEMENT-RELATED INFORMATION | | |
|---|---|---|
| ELEMENT A (1121) | ELEMENT B (1122) | RELEVANCE (1123) |
| SrcIf | TsLogic | ONE WAY FROM A TO B |
| SrcLogic | TsAs | BIDIRECTIONAL |
| . | . | . |

| CONDITIONAL EXPRESSION INITIAL VALUE | |
|---|---|
| INITIAL EXPRESSION ID (1131) | CONDITIONAL EXPRESSION (1132) |
| D1 | IsChangedV(Ts_x, -1) = true |
| D2 | IsChangedV(Src_x, -1) = true |
| . | . |

FIG. 21

DETAILED CONFIGURATION INFORMATION

| CONFIGURATION | | DETAILED CONFIGURATION | |
|---|---|---|---|
| TYPE | CONFIGURATION ID | ELEMENT TYPE | INDIVIDUAL ID |
| Ts | K1 | TsLogic | D1 |
| | | TsLogic | D2 |
| | | TsIf | D1 |
| | | TsV | D1 |
| Ts | K2 | TsLogic | D3 |
| | | TsIf | D2 |
| | | TsV | D2 |
| . | . | . | . |
| Src | K1 | SrcIf | D1 |
| | | SrcV | D1 |
| | | . | . |
| . | . | . | . |

FIG. 22

DETAILED RELATED INFORMATION

| ELEMENT X | | ELEMENT Y | | RELATIONSHIP | SIMILARITY |
|---|---|---|---|---|---|
| ELEMENT TYPE | INDIVIDUAL ID | ELEMENT TYPE | INDIVIDUAL ID | | |
| TsLogic | D1 | TsLogic | D4 | SIMILAR | 0.9 |
| SrcLogic | D1 | TsAs | D4 | X DEPENDS ON Y | — |
| . | . | . | . | . | . |

FIG. 23

| FAILURE FACTOR | CONFIGURATION ID | VERSION | FAILURE CAUSE | | SCORE | RULE ID |
|---|---|---|---|---|---|---|
| | | | CALCULATION | USER DESIGNATION | | |
| TEST SCRIPT | K1 | V1 | YES | O | 0.7 | R1 |
| TEST DATA | K1 | V1 | – | O | 0 | – |
| TEST TARGET SOFTWARE | K1 | V1 | – | ● | 0 | – |
| TEST ENVIRONMENT | K1 | V1 | – | O | 0 | – |

TEST CASE ID: K1    TEST EXECUTION ID: E1

SET/CHANGE FAILURE CAUSE

G21
G22

ANALYSIS DEVICE AND ANALYSIS METHOD

TECHNICAL FIELD

The present invention relates to an analysis device and an analysis method.

BACKGROUND ART

The importance of securing the quality of software is increasing, and tools for finding defects and the like have also been developed. PTL 1 discloses a product-related candidate generation device including a period extraction unit that inputs predetermined management tool data including a test result for each of a defect that is a product in a defect management tool, a revision that is a product in a configuration management tool, and a test item that is a product in a test management tool from the test management tool, the configuration management tool, and the defect management tool, and extracts a period until the test result related to the defect changes from failure to success or from success to failure; and a narrowing processing unit that narrows down related candidates in association between the defect and another product related to the defect using a relationship of attribute change between the products in an extraction period by the period extraction unit.

CITATION LIST

Patent Literature

PTL 1: JP 2015-69615 A

SUMMARY OF INVENTION

Technical Problem

In the invention described in PTL 1, it is not possible to specify a cause of the failure of the test.

Solution to Problem

An analysis device according to a first aspect of the present invention is an analysis device that specifies a cause when a test of test target software fails in a test environment that is an environment for executing a test. In the test, execution of test target software and confirmation of an execution result are executed by a test script without human intervention. Test data is data read into the test target software and the test script when the test is executed. The analysis device includes: a score calculation unit that calculates a failure cause score for each of test target software, test data, a test script, and a test environment based on the presence or absence of a change; and an estimation unit that estimates, based on a failure cause score, whether the test has failed due to test target software, test data, a test script, or a test environment.

An analysis method according to a second aspect of the present invention is an analysis method for causing a computer to specify a cause when a test of test target software fails in a test environment that is an environment for executing a test. In the test, execution of test target software and confirmation of an execution result are executed by a test script without human intervention. Test data is data read into the test target software and the test script when the test is executed. The analysis method includes: calculating a failure cause score for each of test target software, test data, a test script, and a test environment based on the presence or absence of a change; and estimating, based on a failure cause score, whether the test has failed due to test target software, test data, a test script, or a test environment.

Advantageous Effects of Invention

According to the present invention, it is possible to specify whether the cause of the test failure is the test target software, the test data, the test script, or the test environment.

BRIEF DESCRIPTION OF DRAWINGS

FIG. 4 is a diagram illustrating an example of configuration information.

FIG. 5 is a diagram illustrating an example of test case information.

FIG. 6 is a diagram illustrating an example of score calculation rule information.

FIG. 7 is a diagram illustrating an example of change history information.

FIG. 8 is a diagram illustrating an example of test execution information.

FIG. 9 is a diagram illustrating an example of score aggregation information.

FIG. 10 is a diagram illustrating an example of name correspondence information.

FIG. 11 is a diagram illustrating an example of output to an output device.

FIG. 15 is a diagram illustrating an example of extended test case information.

FIG. 16 is a diagram illustrating an example of score calculation extension rule information.

FIG. 18 is a diagram illustrating an example of element definition information.

FIG. 19 is a diagram illustrating an example of element-related information.

FIG. 20 is a diagram illustrating an example of conditional expression initial values.

FIG. 21 is a diagram illustrating an example of detailed configuration information.

FIG. 22 is a diagram illustrating an example of detailed related information.

FIG. 23 is a diagram illustrating an example of output to an output device by a display generation unit.

DESCRIPTION OF EMBODIMENTS

First Embodiment

Hereinafter, a first embodiment of an analysis device according to the present invention will be described below with reference to FIGS. 1 to 13.

Figure 1:
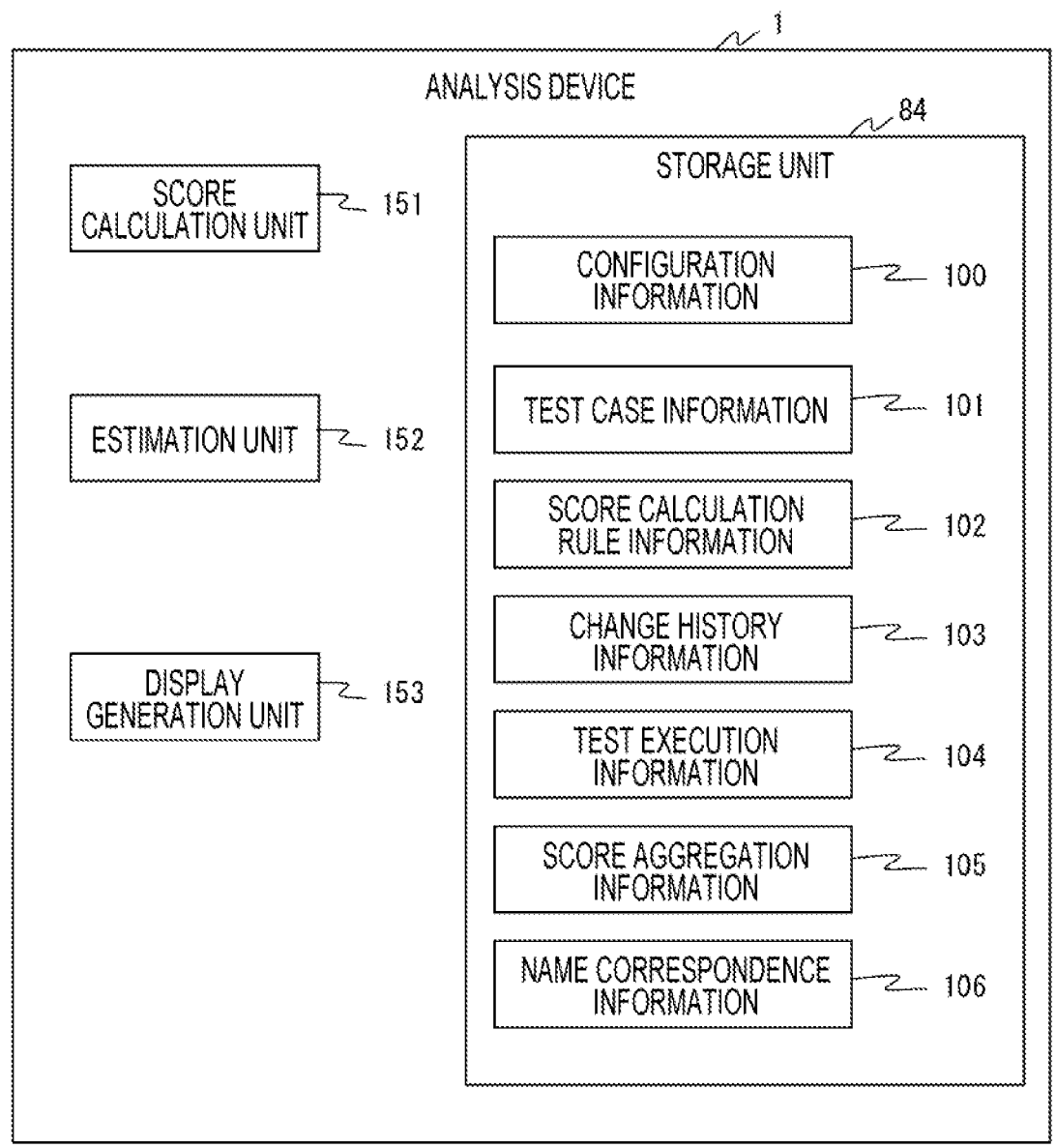
FIG. 1 is a functional configuration diagram of an analysis device according to a first embodiment.

FIG. 1 is a functional configuration diagram of an analysis device 1 that analyzes a test result of software. The analysis device 1 includes a score calculation unit 151, an estimation unit 152, and a display generation unit 153 as its functions. The analysis device 1 includes a storage unit 84. The storage unit 84 stores test case information 101, score calculation rule information 102, change history information 103, test execution information 104, score aggregation information 105, and name correspondence information 106.

Figure 2:
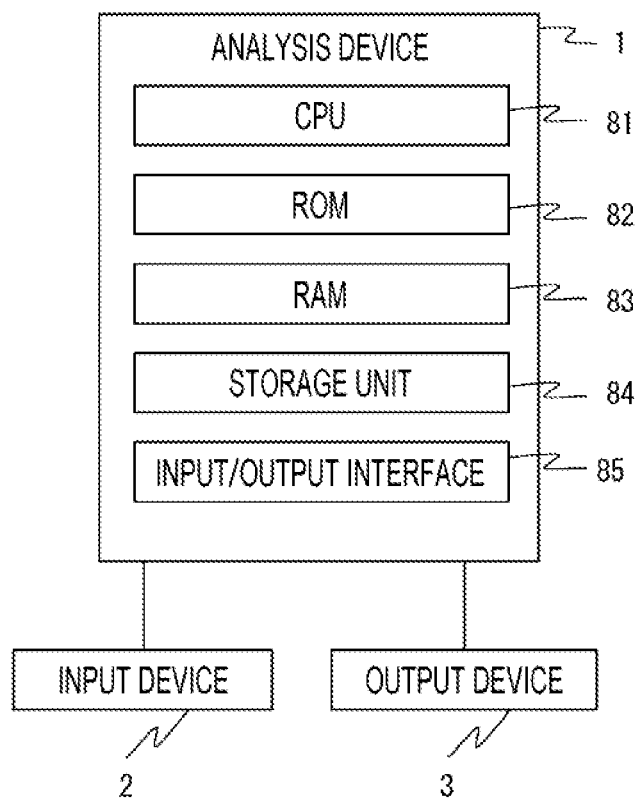
FIG. 2 is a hardware configuration diagram of the analysis device.

FIG. 2 is a hardware configuration diagram of the analysis device 1. The analysis device 1 includes a CPU 81 that is a central processing unit, a ROM 82 that is a read-only storage device, a RAM 83 that is a readable/writable storage device, a storage unit 84, and an input/output interface 85. The analysis device 1 is connected to an input device 2 and an output device 3 via the input/output interface 85. The input device 2 is a keyboard or a mouse. The output device 3 is a device that displays a video, for example, a liquid crystal display. However, a touch panel or the like in which the input device 2 and the output device 3 are integrated may be used. The input device 2 transmits an input of a human (hereinafter, referred to as "user") using the analysis device to the analysis device 1. The output device 3 presents information output by the analysis device 1 to the user.

The CPU 81 develops a program stored in the ROM 82 in the RAM 83 and executes the program, thereby implementing the score calculation unit 151, the estimation unit 152, and the display generation unit 153. However, the score calculation unit 151, the estimation unit 152, and the display generation unit 153 may be implemented by a field programmable gate array (FPGA) which is a rewritable logic circuit or an application specific integrated circuit (ASIC) which is an integrated circuit for a specific purpose instead of a combination of the CPU 81, the ROM 82, and the RAM 83. Further, the score calculation unit 151, the estimation unit 152, and the display generation unit 153 may be implemented by a combination of different configurations, for example, a combination of the CPU 81, the ROM 82, the RAM 83, and an FPGA may be used instead of a combination of the CPU 81, the ROM 82, and the RAM 83.

The storage unit 84 is a nonvolatile storage device, for example, a hard disk drive or a flash memory. Most of the information stored in the storage unit 84 is created in advance, and only the score aggregation information 105 is created by the score calculation unit 151 and the estimation unit 152. The input/output interface 85 may be a general-purpose communication interface or a dedicated interface conforming to the specifications of the input device 2 and the output device 3.

Figure 3:
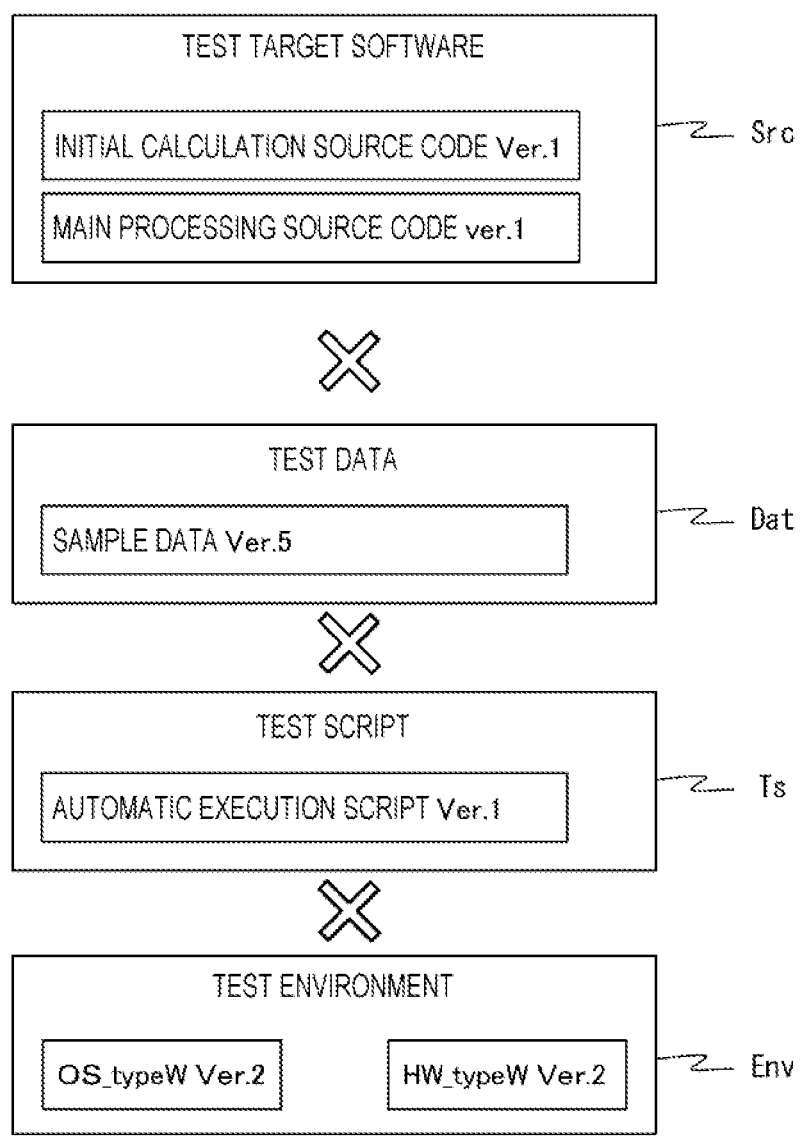
FIG. 3 is a diagram for explaining an outline of a test analyzed by the analysis device.

FIG. 3 is a diagram for explaining an outline of a test analyzed by the analysis device 1. The test to be analyzed in the present embodiment is directed to software. However, not only the software itself but also conditions attached to the software affect the test, and thus, these are also included in the test item. Specifically, in the present embodiment, four test components are a test target software Src, a test data Dat, a test script Ts, and a test environment Env. Although various conditions are different for each test, it is common that four components of the test target software Src, the test data Dat, the test script Ts, and the test environment Env are combined.

Hereinafter, the test target software Src, the test data Dat, the test script Ts, and the test environment Env may be referred to as "types" of the components. In addition, these components are conceptual, and specific components are actually used. For example, the test target software Src includes resources such as a plurality of source codes and icons, which are updated according to the development situation and the version number is changed.

The test target software Src is software that is originally a test target. The test target software Src includes, for example, one or a plurality of source codes. In the example illustrated in FIG. 2, the test target software Src includes two source codes, but the number of source codes may increase or decrease with the progress of development. In addition, the version number of each source code is changed each time the content is changed. That is, the version of the source code may be different for each test, or the number of source codes may be different. The test target software Src may include, for example, a statically linked library in addition to the source code.

The test data Dat is data read by the test target software Src and the test script Ts at the time of test execution, and is, for example, a combination of a variable name and a value thereof. The test data Dat includes one or a plurality of pieces of data. These pieces of data are prepared according to the test target software Src, and are, for example, text data, image data, audio data, or the like, or a combination thereof. In the example illustrated in FIG. 2, the test data Dat includes one sample data. The version number of each data is changed each time the content is changed.

The test script Ts is a script file for executing the test target software Src in the test and checking the execution result without human intervention. The test script Ts is, for example, a shell script or a batch file. In the example illustrated in FIG. 2, the test script Ts includes one script. The version number of each script is changed each time the content is changed. In the present embodiment, the test "script" is referred to for the sake of convenience, but the script is not essential, and the program itself may be used.

The test environment Env is hardware used for a test and software used for a test, excluding the test target software Src. In the example illustrated in FIG. 2, the test environment Env includes two configurations: an OS and a hardware configuration. The versions are updated each time the test environment is changed or updated. Note that, in the description of this drawing, it has been described that the version number is changed each time the configuration is changed, but the name of the configuration may be changed instead. Details will be described later.

FIG. 4 is a diagram illustrating an example of configuration information 100. The configuration information 100 is information indicating correspondence between specific configurations of the test target software Src, the test data Dat, the test script Ts, and the test environment Env and a configuration ID. However, the configuration information 100 does not include the version number of each configuration. In other words, the configuration information 100 is information that can specify the condition of each test by being combined with the version information of each configuration. In the present exemplary embodiment, the configuration ID is a combination of "K" and a number. For example, in the case where the configuration ID is "K1" in the test target software Src, it is indicated that the test target software Src is configured by two codes of "initial calculation source code" and "main processing source code".

In FIG. 4, four pieces of test target software Src, test data Dat, test script Ts, and test environment Env are collectively illustrated for convenience of drawing, but the respective configuration IDs are independent. For example, in a certain test, the test target software Src may have a configuration ID of "K2", the test data Dat may have a configuration ID of "K4", the test script Ts may have a configuration ID of "K1", and the test environment Env may have a configuration ID of "K2".

FIG. 5 is a diagram illustrating an example of the test case information 101. The test case information 101 is information indicating a configuration of each test case. The test case information 101 includes a plurality of records, and each record includes fields of a test case ID 1011 and a configuration ID 1012. In the test case ID 1011, an identifier of the test case is stored. In the present embodiment, the "test case" is a combination in which a configuration ID is designated for each of the test target software Src, the test data Dat, the test script Ts, and the test environment Env constituting the test. For example, the test case ID "TC1" is a combination of the configuration "K1" of the test target software Src, the configuration "K1" of the test data Dat, the configuration "K1" of the test script Ts, and the configuration "K1" of the test environment Env.

FIG. 6 is a diagram illustrating an example of the score calculation rule information 102. The score calculation rule information 102 is information related to a rule for calculating a failure cause score. The failure cause score is a score for specifying which one of the test script Ts, the test data Dat, the test target software Src, and the test environment Env has caused the test failure. The failure cause score is calculated for each test for each of the test script Ts, the test data Dat, the test target software Src, and the test environment Env. The initial value is zero, and the highest score of the four is determined as the cause of the test failure.

The score calculation rule information 102 includes a plurality of records, and each record includes fields of a rule ID 1021, a conditional expression 1022, and an addition value 1023. The rule ID 1021 is an identifier of a rule for calculating a score, and is represented by a combination of "R" and a number. The conditional expression 1022 is a conditional expression for adding scores, and a value described in the addition value 1023 is added to each failure cause score when the conditional expression is satisfied. The addition value 1023 indicates a value to be added to the failure cause score when the conditional expression is satisfied.

The conditional expression includes a function independently and appropriately made. The function "IsChangedV" is a function that outputs whether there is a change in the particular type of test configuration from the first version to the second version. The function "IsChangedV" outputs "True" when there is a change, and outputs "False" when there is no change. In the function "IsChangedV", a first argument represents the type of the test configuration, a second argument represents a numerical value indicating the first version, and a third argument represents a numerical value indicating the second version. Numerical values of the second argument and the third argument are integers, and "1" or more means a specific version number itself, "0" means a current version, "−1" means a previous version, "−2" means a version two times before, and similarly, a larger negative value means a past version.

For example, "IsChangedV (Ts_x, −1, 0)" outputs whether there is a change in the test script Ts from the previous execution to this time. However, "0" is set as a default argument for the third argument. That is, "IsChangedV (Ts_x, −1)" and "IsChangedV (Ts_x, −1, 0)" mean the same input.

FIG. 7 is a diagram illustrating an example of the change history information 103. The change history information 103 is information indicating a change history of a test component. The change history information 103 includes a plurality of records, and each record has fields of a type 1031, a configuration ID 1032, a version 1033, and a change date and time 1034. The type 1031 is information indicating any one of the test target software Src, the test data Dat, the test script Ts, and the test environment Env. The configuration ID 1032 is one of the configuration IDs 1001 indicated in the configuration information 100, which is information for specifying the configuration. The version 1033 is information for specifying the version of the configuration.

In the present embodiment, version numbers are the same in the same configuration in order to simplify the description, but version numbers may be different in the same configuration. In this case, information designating each version number is the version 1033. The change date and time 1034 is a date and time when the version has been changed. According to the example of FIG. 6 on the premise of the example of FIG. 3, it is indicated that the "automatic execution script" of which the configuration ID of the test script Ts is "K1" has the version "1" created at "4:5:32 on Feb. 3, 2021" in Japan time.

FIG. 8 is a diagram illustrating an example of the test execution information 104. The test execution information 104 is information for managing the configuration of each test and the execution of the test. In the above-described test case, the version of the configuration is not specified, but the version is also specified in the test execution information 104. The test execution information 104 includes a plurality of records, and each record has fields of a test execution ID 1041, a test case ID 1042, a configuration ID and a version 1043, a priority 1044, and a test state 1045.

The test execution ID 1041 is an identifier for discriminating the test, and is represented by a combination of "E" and a number. The test case ID 1042 is the same as the test case ID 1011 in the test case information 101. The configuration ID and the version 1043 are the configuration ID and the version number of each configuration for each of the test script Ts, the test data Dat, the test target software Src, and the test environment Env. Specifically, it is a combination of the configuration ID 1011 in the test case information 101 and the version 1053 in the score aggregation information 105. Since the combination of the test case ID and the configuration ID is indicated in the test case information 101, the information of the test case information 101 and the information of the test execution information 104 overlap in this point.

The priority 1044 is a priority for executing a test. The test specified by the test execution ID of the record whose priority 1044 is set to "high" is executed before the test specified by the test execution ID of the record whose priority 1044 is set to "low".

The test state 1045 is information indicating before and after execution of the test or an execution result of the test. In the example illustrated in FIG. 8, "Success" and "Failure" of the test state 1045 indicate that the test has been executed, and "non-start" of the test state 1045 indicates that the test has not been executed. "Success" in the test state 1045 indicates that the executed test has succeeded, and "failure" in the test state 1045 indicates that the executed test has failed. In the present embodiment, the success of the test means that the execution result of the test target software Src has been as intended by the developer. In the present embodiment, the failure of the test means that the execution result of the test target software Src is not as intended by the developer.

FIG. 9 is a diagram illustrating an example of the score aggregation information 105. The score aggregation information 105 is a table illustrating an aggregation result of the failure cause score for each test and an estimated failure cause. The score aggregation information 105 is generated by the score calculation unit 151 and the estimation unit 152. The score aggregation information 105 includes a plurality of records, and each record has fields of a test execution ID 1051, a failure cause score 1052, a rule ID 1053, and an estimated failure cause 1054. The test execution ID 1051 is the same as the test execution ID 1041 of the test execution information 104. The failure cause score 1052 is a value calculated by the score calculation unit 151 based on the score calculation rule information 102. The rule ID 1053 is a list of rule IDs 1021 input by the score calculation unit 151. The estimated failure cause 1054 is a cause of failure estimated by the estimation unit 152.

FIG. 10 is a diagram illustrating an example of the name correspondence information 106. The name correspondence information 106 is a correspondence table of codes and names, and specifically indicates correspondence between the type ID of the test failure factor and the failure factor type, that is, the type of the configuration.

FIG. 11 is a diagram illustrating an example of output to the output device 3. Specifically, an example of an analysis result for a certain test execution result is illustrated. In the example illustrated in FIG. 11, the result with the test execution ID of "E1" is illustrated, and the test execution ID and the ID of the test case in the test are illustrated at the top. A list of failure factors, configuration IDs, versions, failure factors, scores, and rule IDs is displayed in the center of the screen. The failure factor stores the names of the test script Ts, the test data Dat, the test target software Src, and the test environment Env. In the configuration ID and the version, the configuration ID and the version in the target test, in this example, the test with the test execution ID "E1" are displayed.

As the failure cause, "YES" is displayed in an item estimated as the failure cause. In the score and the rule ID, the failure cause score and the rule ID that has caused the score value are displayed. In the example illustrated in FIG. 11, only the rule with the rule ID "R1" is applicable, and only the failure cause score of the test script Ts is added. Therefore, since the test script Ts has the highest score among the four test scripts, "YES" is displayed in the column of the failure cause of the test script. Note that, in a case where there is a plurality of rules to be applied, a plurality of rule IDs are described in the rule ID field.

Figure 12:
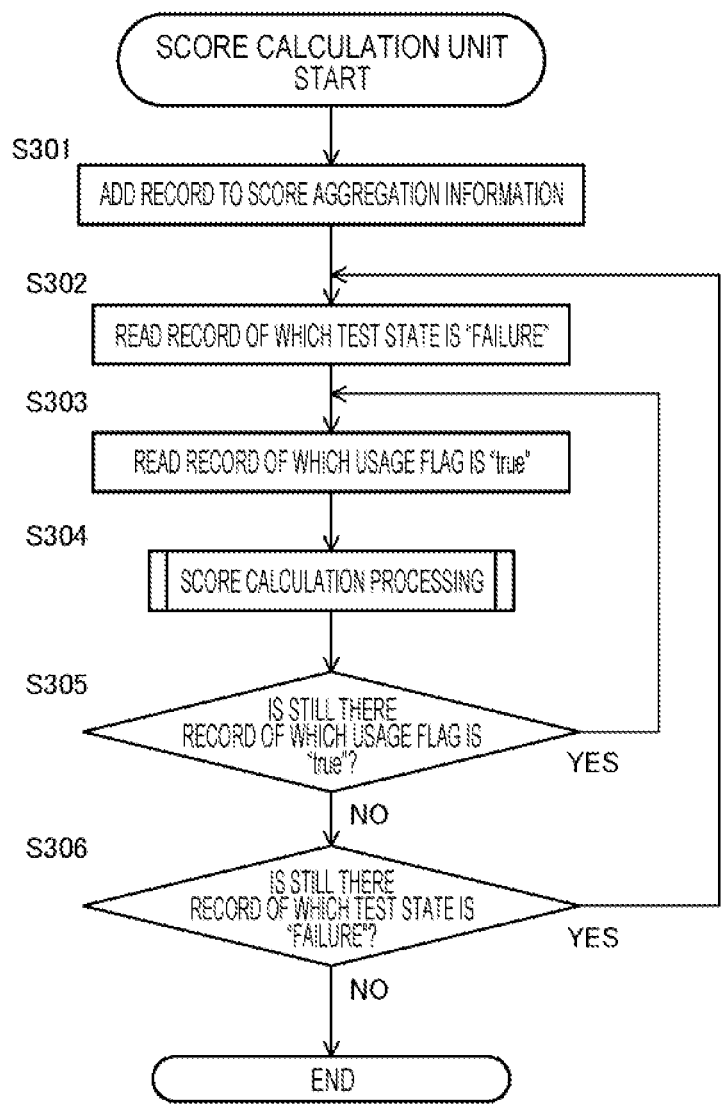
FIG. 12 is a flowchart illustrating processing of a score calculation unit in the first embodiment.

FIG. 12 is a flowchart illustrating processing of the score calculation unit 151. The processing of the score calculation unit 151 described below is started in a state where execution of one or more tests is completed and one or more records of the test execution information 104 are completed. In this case, a record of the test execution ID described in the test execution information 104 is not described in the score aggregation information 105. For example, the processing of the score calculation unit 151 described below is started in a state where three records of E1 to E3 are recorded in the test execution information 104 and no information is recorded in the score aggregation information 105.

In step S301, the score calculation unit 151 adds a record to the score aggregation information 105 and describes a test execution ID to be processed. In the subsequent step S302, the score calculation unit 151 reads one record whose test state 1045 is "Failure". In a case where there is a plurality of records of which the test state 1045 is "failure", any one record that has not been read yet is read. Hereinafter, the record read in this step is referred to as a "target test record".

In the subsequent step S303, the score calculation unit 151 reads a record whose usage flag 1024 is "TRUE" from the score calculation rule information 102. In a case where there is a plurality of records of which the usage flag 1024 is "TRUE", any one record that has not been read yet is read. Hereinafter, the record read in this step is referred to as a "target rule record". In the subsequent step S304, the score calculation unit 151 executes score calculation processing using the target test record and the target rule record. Details of the score calculation processing will be described later.

In the subsequent step S305, the score calculation unit 151 refers to the score calculation rule information 102 and determines whether there is a record whose usage flag 1024 that is not set as the target rule record is "TRUE". The process returns to step S303 when it is determined that there is still another record whose usage flag 1024 is "TRUE", and the process proceeds to step S306 when it is determined that there is no more record whose usage flag 1024 is "TRUE".

In step S306, the score calculation unit 151 determines whether there is a record whose test state 1045 that has not yet been set as the target test record is "Failure". When it is determined that there is still another record whose test state 1045 is "Failure", the process returns to step S302, and when it is determined that there is no other record whose test state 1045 is "Failure", the process illustrated in FIG. 12 ends. For example, in a case where the test execution information 104 includes three records in which the test state 1045 is "Failure", and the score calculation rule information 102 includes five records in which the usage flag 1024 is "True", the score calculation processing in step S304 is executed 15 times as a product of 3 and 5.

Figure 13:
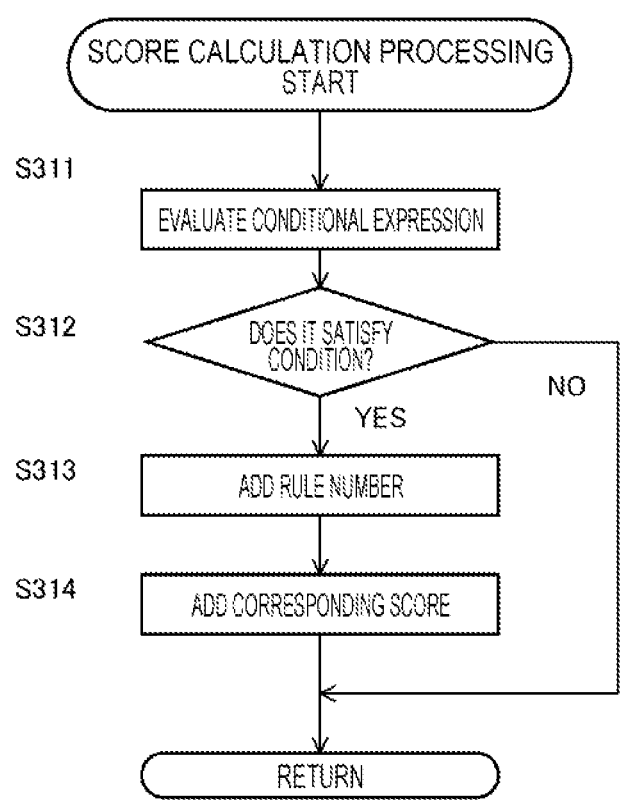
FIG. 13 is a flowchart for explaining details of score calculation processing.

FIG. 13 is a flowchart for explaining step S304 in FIG. 12, that is, details of the score calculation processing. In step the score calculation unit 151 evaluates the conditional expression in the target rule record. Specifically, the score calculation unit 151 calculates the value of the conditional expression to determine whether the condition is satisfied. In the subsequent step S312, the score calculation unit 151 determines whether the condition in the target rule record is satisfied according to the evaluation result in step S311. When determining that the condition is satisfied, the score calculation unit 151 proceeds to step S313, and when determining that the condition is not satisfied, the score calculation unit 151 ends the processing illustrated in FIG. 13.

In step S313, the score calculation unit 151 adds the rule ID 1021 of the target rule record to the rule ID 1053 of the record added in step S301 of FIG. 12 in the score aggregation information 105. However, the addition value 1023 is not added to the failure cause of 0. For example, when the target test record is the record "E1" illustrated in the uppermost row of FIG. 7 and the target rule record is the record "R1" illustrated in the uppermost row of FIG. 5, values other than the test script Ts are 0. Therefore, "R1" is described only in the column "Ts" in the rule ID 1053 of the score aggregation information 105, and is not described in other columns.

In the subsequent step S314, the score calculation unit 151 adds the addition value 1023 of the target rule record to the failure cause score 1052 of the score aggregation information 105, and ends the processing illustrated in FIG. 13. However, since the initial value of the score is 0, in a case where only one rule is applicable, the value of the failure cause score 1052 is the value of the addition value 1023 of the corresponding rule. When the processing by the score calculation unit 151 is completed, each record of the score aggregation information 105 is in a state in which the test execution ID 1051, the failure cause score 1052, and the rule ID 1053 are described, and the estimated failure cause 1054 remains blank.

The estimation unit 152 describes the estimated failure cause 1054 of each record of the score aggregation information 105 generated by the score calculation unit 151. Specifically, the estimation unit 152 compares the value of the failure cause score 1052 in each record of the score aggregation information 105, and describes the name of the failure cause having the maximum value in the estimated failure cause 1054. When there is a plurality of failure causes having the maximum value, the estimation unit 152 describes all the failure causes in the estimated failure cause 1054.

The display generation unit 153 generates the video of the display screen illustrated in FIG. 11 with reference to the test execution information 104 and the score aggregation information 105, and outputs the video to the input/output interface 85. First, the display generation unit 153 specifies a test execution ID of a test to be displayed from the outside and starts processing. The display generation unit 153 describes the designated test execution ID as, for example, "E1" in the upper right of the screen.

Next, the display generation unit 153 specifies a record of the test execution information 104 corresponding to the designated test execution ID. Then, the test case ID 1042, the configuration ID, and the value of the version 1043 described in the specified record are transcribed to the screen. Further, the display generation unit 153 specifies a record of the score aggregation information 105 corresponding to the designated test execution ID, and transcribes the values of the failure cause score 1052 and the rule ID 1053 to the screen. Finally, the display generation unit 153 writes "YES" in the column of failure cause corresponding to the estimated failure cause 1054, and ends the process.

According to the first embodiment described above, the following operational effects can be obtained.

(1) The analysis device 1 specifies a cause when the test of the test target software Src fails in the test environment Env that is an environment for executing the test. In this test, the execution of the test target software and the confirmation of the execution result are executed by the test script Ts without human intervention. The test data Dat is data read into the test target software Src and the test script Ts when the test is executed. There are included: a score calculation unit 151 that calculates a failure cause score 1052 on the basis of the presence or absence of a change for each of the test target software Ts, the test data Dat, the test script Ts, and the test environment Env; and an estimation unit 152 that specifies, on the basis of the failure cause score 1052, whether the test has failed due to the test target software Src, the test data Dat, the test script Ts, or the test environment Env. Therefore, it is possible to specify whether the cause of the test failure is the test target software Src, the test data Dat, the test script Ts, or the test environment Env.

The software test is performed for the purpose of improving the quality of the test target software Src, but may fail due to other causes constituting the test, that is, the test data Dat, the test script Ts, and the test environment Env. A person skilled in the art of testing including the test environment Env can find the cause of the failure of the test at an early stage, but an inexperienced person cannot easily specify the cause of the failure of the test. However, by using the analysis device 1, even a person other than an expert can easily specify the cause of the test failure, and the efficiency of software development can be improved.

(2) The analysis device 1 includes the storage unit 84 that stores the score calculation rule information 102 including a plurality of combinations of the conditional expression 1022 and the addition value 1023 of the failure cause score added in a case where the conditional expression 1022 is satisfied. The score calculation unit 151 calculates the failure cause score 1052 based on the score calculation rule information 102. The analysis device 1 includes a display generation unit 153 that generates video information including a failure cause score 1052 and a rule ID 1053 that is information indicating a conditional expression used to calculate the failure cause score 1052, for example, video information illustrated in FIG. 11, and an input/output interface 85 that outputs the video information generated by the display generation unit 153 to the output device 3. Therefore, the analysis device 1 can present the user with the reason for specifying the failure cause.

(3) The conditional expression 1022 relates to a change of a detailed component which is a component of each of the test target software Src, the test data Dat, the test script Ts, and the test environment Env. Therefore, the analysis device 1 can specify the cause of the failure using objective facts.

(First Modification)

In the first embodiment described above, the analysis device 1 has been described as one hardware device. However, the analysis system may be configured as an analysis system in which a plurality of hardware devices share and implement the same function as the analysis device 1.

Second Embodiment

A second embodiment of the analysis device will be described with reference to FIGS. 14 to 31. In the following description, the same components as those on the first embodiment are denoted by the same reference numerals, and differences will be mainly described. The points that are not particularly described are the same as in the first embodiment. The present embodiment is different from the first embodiment mainly in that score calculation n rule information 102 is generated.

Figure 14:
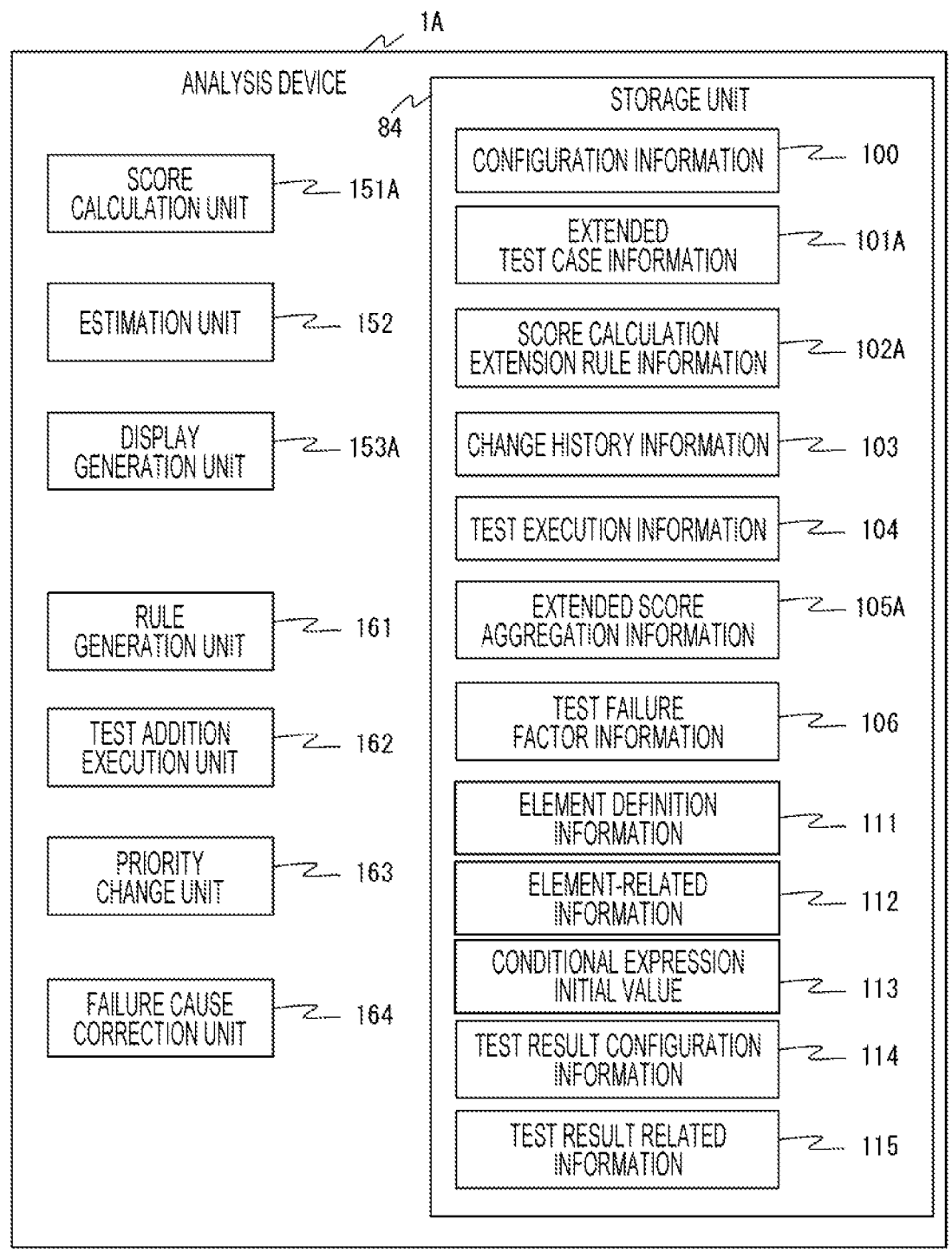
FIG. 14 is a functional configuration diagram of an analysis device according to a second embodiment.

FIG. 14 is a functional configuration diagram of an analysis device 1A according to the second embodiment. In addition to the configuration of the first embodiment, the analysis device 1A according to the present embodiment further includes a rule generation unit 161, a test addition execution unit 162, a priority change unit 163, and a failure cause correction unit 164. The storage unit M further stores element definition information 111, element-related information 112, a conditional expression initial value 113, detailed configuration information 114, and detailed related information 115. In addition, in the storage unit M, extended test case information 101A is stored instead of the test case information 101, score calculation extension rule information 102A is stored instead of the score calculation rule information 102, and extended score aggregation information 105A is stored instead of the score aggregation information 105. Furthermore, the operations of a score calculation unit 151A and a display generation unit 153A are different from those of the first embodiment.

In the first embodiment, most of the information stored in the storage unit 84 is created in advance, but this is not the case in the present embodiment. In the present embodiment, the configuration information 100, the change history information 103, the name correspondence information 106, the element definition information 111, the element-related information 112, the conditional expression initial value 113, the detailed configuration information 114, and the detailed related information 115 are created in advance. Some records of the extended test case information 101A are added by the test addition execution unit 162. The score calculation extension rule information 102A is generated by the rule generation unit 161. However, some records may be recorded in advance in the score calculation extension rule information 102A. In the test execution information 104, some records are written by the test addition execution unit 162, and priorities 1044 of some records are written by the priority change unit 163. The extended score aggregation information 105A is written in some fields by the failure cause correction unit 164.

FIG. 15 is a diagram illustrating an example of extended test case information 101A. In the extended test case information 101A, a field of confirmation 1013 is added to each record of the test case information 101 in the first embodiment. The confirmation 1013 indicates whether the result of the test is determined by the computer or the operator. In the test case in which the confirmation 101 is "automatic", it is determined whether the test result is success or failure by the test script Ts. For test cases where the confirmation 101 is "Manual", the operator determines whether the result of the test is a success or a failure.

FIG. 16 is a diagram illustrating an example of the score calculation extension rule information 102A. In the score calculation extension rule information 102A, fields of detailed state 1025 and a reliability 1026 are added to each record of the score calculation rule information 102 in the first embodiment. The detailed state 1025 is rewritten in the process of creating a detailed rule based on an existing rule. Specifically, the detailed state 1025 transitions from the "Not detailed" of the initial state to the final "Completed" through the "In detailing" and the "Difference value uncalculated". The reliability 1026 is a numerical value of 0 to 1.0 indicating the reliability of the rule, and the initial value is "1.0" indicating that the reliability is the highest.

The score calculation extension rule information 102A includes the following conditional expression that is not included in the score calculation rule information 102 according to the first embodiment. The function "IsChangedT" is a function that outputs whether there is a change in the specific type of the test configuration from the first time to the second time. "True" is output when there is a change, and "False" is output when there is no change. In the function "IsChangedT", the first argument represents the type of the test configuration, the second argument represents a numerical value indicating the first time, and the third argument represents a numerical value indicating the second time. The function "IsSuccess" outputs whether the argument is a conditional expression and the evaluation result of the conditional expression of the argument is "True".

Figure 17:
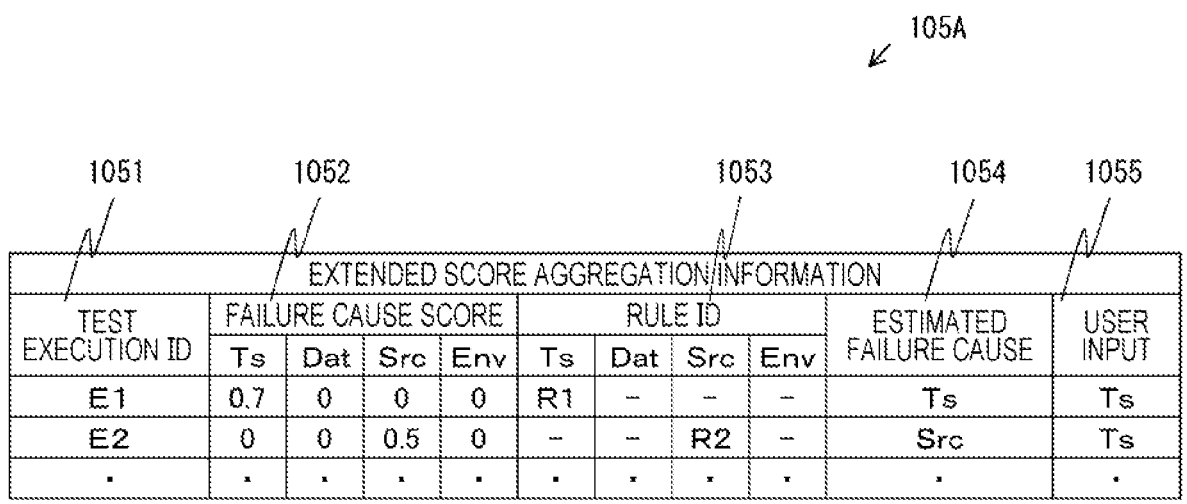
FIG. 17 is a diagram illustrating an example of extended score aggregation information.

FIG. 17 is a diagram illustrating an example of the extended score aggregation information 105A. In the extended score aggregation information 105A, a field of the user input 1055 is added to each record of the score aggregation information 105 in the first embodiment. The user input 1055 is a failure cause of the test input by the user, and is any one of the test script Ts, the test data Dat, the test target software Src, and the test environment Env. When the test is executed, at least one field of the estimated failure cause 1054 and the user input 1055 is input.

FIG. 18 is a diagram illustrating an example of the element definition information 111. The element definition information 111 indicates an element type in which classification is subdivided for each type of component. That is, in the beginning of the first embodiment, it has been described that each test includes four components of the test script Ts, the test data Dat, the test target software Src, and the test environment Env, but the types of the components are subdivided into element types. The element definition information 111 includes a plurality of records, and each record has fields of a type 1111, an element type 1112, and a configuration name 1113. The type 1111 indicates which type is a component of the test. The element type 1112 is a type of a subdivided configuration. The configuration name 1113 is a name of a detailed configuration. Hereinafter, the element type is also referred to as a "detailed component".

In the example illustrated in FIG. 18, Src is subdivided into SrcIf as interface, a constant/variable SrcV, a processing logic SrcLogic, a comment SrcCmt, and a component Src-Comp. Note that, in the example illustrated in FIG. 18, all types are subdivided into two or more configurations, but it is not essential to subdivide all types, and at least one type of configuration may be subdivided. Although the details will be described later, types the element are also merely classifications and do not indicate specific configurations. Therefore, the element type is associated with the specific configuration by combining the individual ID with the element type.

FIG. 19 is a diagram illustrating an example of the element-related information 112. The element-related information 112 indicates a relationship between the detailed configurations. The element-related information 112 includes one or more records, and each record has fields of an element A1121, an element B1122, and a relevance 1123. The element A1121 and the element B1122 show any detailed configuration. The relevance 1123 indicates a relationship between the element A1121 and the element B1122. In the example shown in the first record of FIG. 19, it is shown that a change in the element A1121 affects the element B1122, but a change in the element B1122 does not affect the element A1121, since the relevance 1123 is "one way from A to B".

Since the relevance 1123 in the second record is "bidirectional", it is indicated that both changes affect the other. Note that the element A and the element B are for convenience, and it means the same even if the element A and the element B are interchanged in the first record and the relevance 1123 is set to "one direction from B to A" in the opposite direction.

FIG. 20 is a diagram illustrating an example of the conditional expression initial value 113. The conditional expression initial value 113 is an initial value read by the rule generation unit 161 to generate the plurality of conditional expressions 1022. The conditional expression initial value 113 includes one or more records, and each record includes an initial expression ID 1131 and a conditional expression 1132. The initial expression ID 1131 is an identifier of the initial expression. The conditional expression 1132 is an initial conditional expression. As will be described in detail later, the rule generation unit 161 creates various conditional expressions using the conditional expression 1132.

FIG. 21 is a diagram illustrating an example of the detailed configuration information 114. The detailed configuration information 114 is information indicating a correspondence between a configuration ID for each configuration type and a specific configuration of the detailed configuration, that is, a combination of an element type and an individual ID. Although the detailed classification has been described for each type of test configuration in the element definition information 111, these are merely classifications and are not specific configurations. Therefore, in the present embodiment, the element type and the individual ID are combined to be associated with a specific configuration. The detailed configuration information 114 indicates a correspondence between the configuration 1141 and the detailed configuration 1142, and specifically, indicates a correspondence between a configuration ID for each type and a combination of an element type and an individual ID.

FIG. 22 is a diagram illustrating an example of the detailed related information 115. The detailed related information 115 is a relationship between specific configurations, and is different in a specific point from a general correlation between types indicated in the element-related information 112. The detailed related information 115 includes one or more records, and each record has fields of an element X1151, an element Y1152, a relationship 1153, and a similarity 1154. The element X1151 and the element Y1152 are a combination of an element type and an individual ID that specify a specific configuration. The relationship 1153 is a relationship between the element X1151 and the element Y1152, and is any of "Similar", "X depends on Y", and "Y depends on X". The similarity 1154 is a degree of similarity between the element X1151 and the element Y1152, and is represented by a value of 0 to 1. Note that a value is set to the similarity 1154 only in a case where the relationship 1153 is "Similar".

FIG. 23 is a diagram illustrating an example of output to the output device 3 by the display generation unit 153A. Specifically, an example of an analysis result for a certain test execution result and an input by the user is illustrated. The display generation unit 153A performs processing of the display generation unit 153 in the first embodiment, and further reflects an input operation by the user using the input device 2 on the output device 3. A difference from FIG. 10 in the first embodiment is that a field of a failure cause is subdivided into "Calculation" and "user designation". In a column of "Calculation" between "Calculation" and "User designation", similarly to the first embodiment, a cause of failure estimated by the estimation unit 152 is indicated by "YES". A value is input in the field of "User designation" by user input.

In the field of "User designation", for example, radio buttons are disposed as indicated by reference numeral G21, and the user can select only one of the four. After the user selects one of them, the user selects a button denoted by reference character G22, so that the value input by the user is input to the analysis device 1 as the value of the user input 1055 of the extended score aggregation information 105A. In the example illustrated in FIG. 23, unselected is represented by a white circle, and selected is represented by a black circle.

Figure 24:
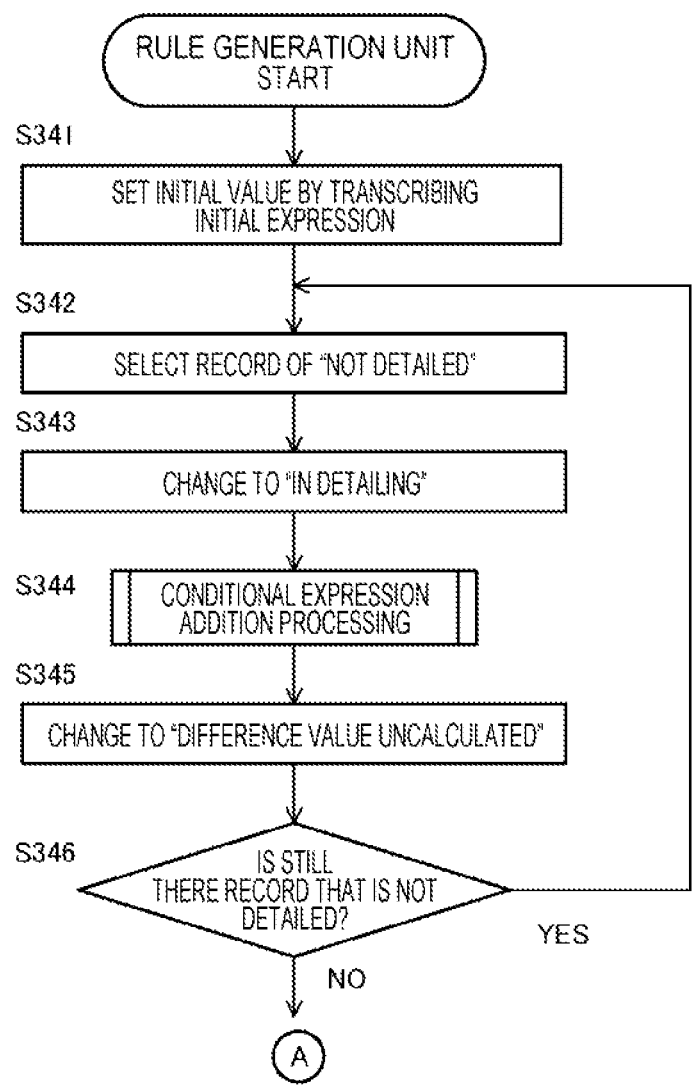
FIG. 24 is a flowchart illustrating processing of a rule generation unit.
Figure 25:
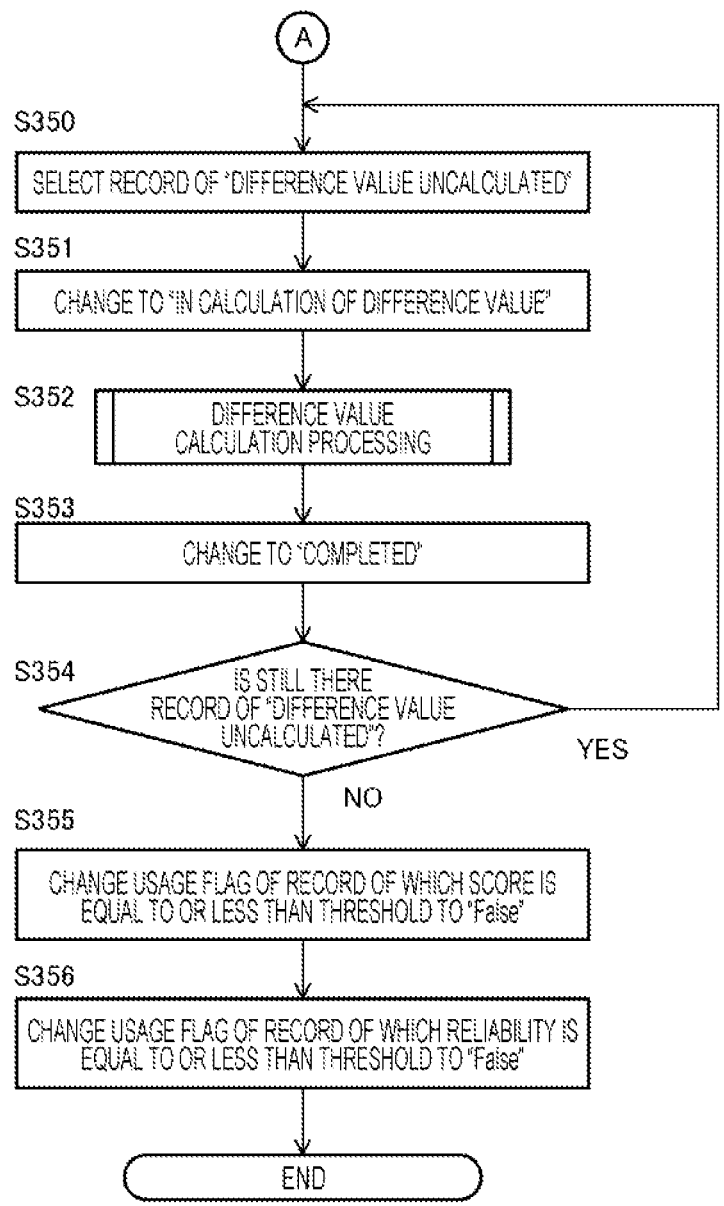
FIG. 25 is a flowchart illustrating processing of a rule generation unit.

FIGS. 24 and 25 are flowcharts illustrating processing of the rule generation unit 161. At a point of time when the rule generation unit 161 starts processing, some records may exist in the score calculation extension rule information 102A, or no record may exist. First, in step S341, the rule generation unit 161 reads the initial expression 113, transcribes all the conditional expressions 1132 to a field of the conditional expression 1022 of the score calculation extension rule information 102A, and sets initial values to the detailed state 1025, the reliability 1026, and the usage flag 1024.

Specifically, "Not detailed" is set in the detailed state 1025, "1.0" is set in the reliability 1026, "True" is set in the usage flag 1024, and the process proceeds to the next step S342.

In the subsequent step S342, the rule generation unit 161 arbitrarily selects one record of which the detailed state 1025 is "Not detailed" in the score calculation extension rule information 102A. Hereinafter, the record selected in step S342 is referred to as a "Detailed target record". In the subsequent step S343, the rule generation unit 161 changes the detailed state 1025 of the detailed target record selected in step S342 to "In detailing". In the subsequent step S344, the rule generation unit 161 executes conditional expression addition processing to be described later on the record to be detailed, and in subsequent step S345, the rule generation unit 161 changes the detailed state 1025 of the record to be processed to "Difference value uncalculated".

In the subsequent step S346, the rule generation unit 161 determines whether there is a record of which the detailed state 1025 is "Not detailed" in the score calculation extension rule information 102A. The rule generation unit 161 returns to step S342 when determining that there is still a record whose detailed state 1025 is "Not detailed", and proceeds to step S350 in FIG. 25 via circled A when determining that there is no record whose detailed state 1025 is "Not detailed".

In step S350 of FIG. 25, the rule generation unit 161 arbitrarily selects one record whose detailed state 1025 is "Difference value uncalculated" in the score calculation extension rule information 102A. Hereinafter, the record selected in step S342 is referred to as a "Difference target record". In the subsequent step S343, the rule generation unit 161 changes the detailed state 1025 of the difference target record to "In detailing". In the subsequent step S344, the rule generation unit 161 executes difference land calculation to be described later for the difference target record, and in the subsequent step S345, the rule generation unit 161 changes the detailed state 1025 of the difference target record to "Completed".

In the subsequent step S354, the rule generation unit 161 determines whether there is a record in which the detailed state 1025 is "Difference value uncalculated" in the score calculation extension rule information 102A. The rule generation unit 161 returns to step S350 when determining that there is still a record whose detailed state 1025 is "Difference value uncalculated", and proceeds to step S355 when determining that there is no record whose detailed state 1025 is "Difference value uncalculated".

In step S355, the rule generation unit 161 changes the usage flag 1024 of the record in which all the four types of scores of the addition value 1023 in the score calculation extension rule information 102A are less than a predetermined threshold, for example, 0.5, to "False". In the subsequent step S356, the rule generation unit 161 changes the usage flag 1024 of the record in which the value of the reliability 1026 is less than a predetermined threshold, for example, 0.4 in the score calculation extension rule information 102A to "False", and ends the process illustrated in FIG. 25.

Figure 26:
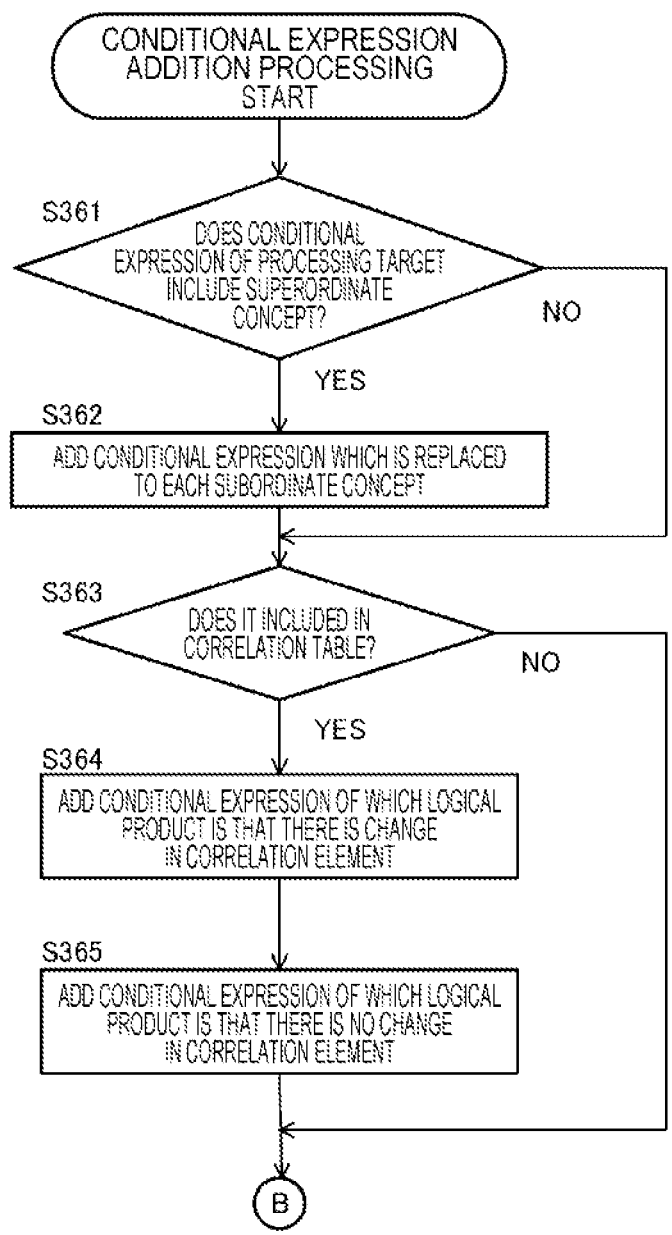
FIG. 26 is a flowchart illustrating details of conditional expression addition processing.
Figure 27:
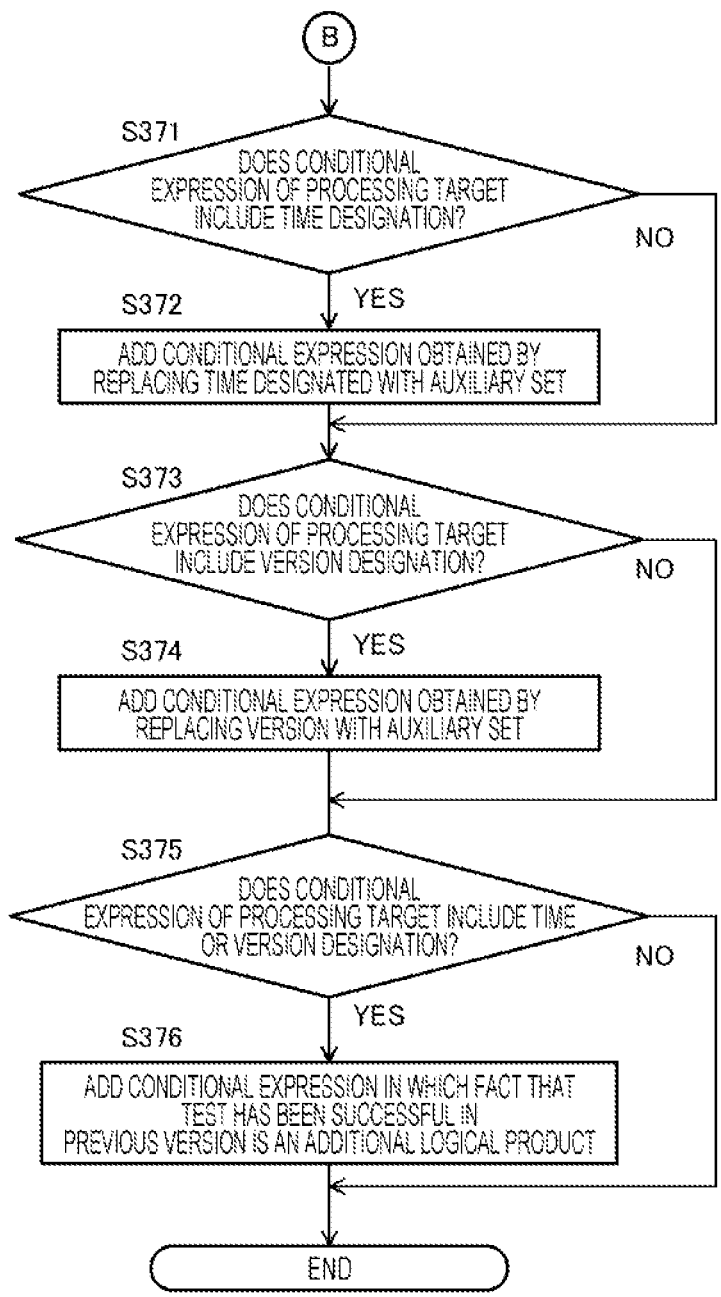
FIG. 27 is a flowchart illustrating details of conditional expression addition processing.

FIGS. 26 and 27 are flowcharts illustrating details of the process of step S344 in FIG. 24, that is, the conditional expression addition processing. Although not individually described below, the conditional expression generated in FIGS. 26 and 27 is added to a new record of the score calculation expansion rule information 102A, but the detailed state 1025 of this record is set to "Completed" from the beginning. Further, similarly to the above, the reliability 1026 is set to "1", and the usage flag 1024 is set to "True".

As described above, the record to be detailed is determined before the conditional expression addition processing is executed. First, in step S361, the rule generation unit 161 determines whether the conditional expression in the record to be detailed includes any one of superordinate concepts, that is, Ts, Dat, Src, and Env. The rule generation unit 161 proceeds to step S362 when determining that any superordinate concept is included, and proceeds to step S363 when determining that no superordinate concept is included.

In step S362, the rule generation unit 161 refers to the element definition information 111, adds a conditional expression in which the superordinate concept is replaced with each subordinate concept to a new record of the score calculation extension rule information 102A, and proceeds to step S363. For example, in a case where the conditional expression of the record to be detailed includes Src, five conditional expressions in which Src of the conditional expression is replaced with SrcIf, SrcV, SrcLogic, SrcCmt, and SrcComp are added. Note that an initial value is set in the detailed state 1025 and the like of the added record, that is, "Not detailed" is set in the detailed state 1025, "1.0" is set in the reliability 1026, and "True" is set in the usage flag 1024.

In step S363, the rule generation unit 161 determines whether the conditional expression in the record to be detailed and the conditional expression added in step S362 include any element type included in the element-related information 112. The rule generation unit 161 proceeds to step S364 when determining that any element type included in the element-related information 112 is included, and proceeds to FIG. 27 via circled B when determining that none of the element types included in the element-related information 112 is included.

Hereinafter, an element type paired with the element type determined to be included in the element-related information 112 in step S363 is referred to as "Correlation element". For example, in a case where TsAs is included in either the conditional expression in the record to be detailed or the conditional expression added in step S362, SrcLogic is called a correlation element from the description of the second record according to the example of FIG. 19.

In step S364, the rule generation unit 161 adds, to a conditional expression including any element type included in the element-related information 112, a conditional expression whose logical product is that there is a change in the correlation element. For example, when either the conditional expression in the record to be detailed or the conditional expression added in step S362 is "IsChangedV (TsAs_x, −1)=true", the following conditional expression is generated in step S364. That is, when it is found from the detailed related information 115 that "TaAs" included in the existing conditional expression depends on "SrcLogic", a conditional expression of "IsChangedV (TsAs_x, −1)=true && IsChangedV (SrcLogic_x, −1)=true" which is a logical product of "IsChangedV (SrcLogic_x, −1)=true" which is a conditional expression indicating that "SrcLogic" is changed is added. This conditional expression is indicated by the rule ID of "R15" in the score calculation extension rule information 102A.

In the subsequent step S365, the rule generation unit 161 adds, to a conditional expression including any element type included in the element-related information 112, a conditional expression whose logical product is that there is no change in the correlation element. That is, a logical product of a condition opposite to that in step S363 is obtained. That is, on the premise similar to the example of step S363, a conditional expression "IsChangedV (TsAs_x, −1) true & & IsChangedV (SrcLogic_x, −1)=false" is added in this step. This conditional expression is indicated by the rule ID of "R16" in the score calculation extension rule information 102A. When the processing in step S365 is completed, the rule generation unit 161 proceeds to FIG. 27 via circled B.

In FIG. 27, first, in step 371, the rule generation unit 161 determines whether any one of the conditional expression in the record to be detailed and the conditional expression added in step S362 includes time designation. When it is determined that any of the conditional expressions includes the time designation, the process proceeds to step S372, and when it is determined that none of the conditional expressions includes the time designation, the process proceeds to step S373. In step S372, the rule generation unit 161 adds a conditional expression obtained by replacing the time designated in the expression including the time designation with the auxiliary set to the new record of the score calculation extension rule information 102A, and proceeds to step S373.

In step S373, the rule generation unit 161 determines whether any one of the conditional expression in the record to be detailed and the conditional expression added in step S362 includes version designation. When it is determined that any of the conditional expressions includes version designation, the process proceeds to step S374, and when it is determined that none of the conditional expressions includes version designation, the process proceeds to step S375. In step S374, the rule generation unit 161 adds the conditional expression in which the version designated in the expression including the version designation is replaced with the auxiliary set to a new record of the score calculation extension rule information 102A, and proceeds to step S375.

In step S375, the rule generation unit 161 determines whether any one of the conditional expression in the record to be detailed and the conditional expression added in step S362 includes time designation or version designation. In a case where it is determined that any of the conditional expressions includes the time designation or the version designation, the process proceeds to step S376, and in a case where it is determined that none of the conditional expressions includes the version designation, the process illustrated in FIG. 27 ends.

In step S376, the rule generation unit 161 adds, to the conditional expression including the time designation or the version designation, a conditional expression in which the fact that the test has been successful in the previous version is an additional logical product, and ends the processing illustrated in FIG. 27. For example, in a case where any one of the conditional expression in the record to be detailed and the conditional expression added in step S362 is "IsChangedV (TsAs_x, −1)=true", a conditional expression "IsChangedV (TsAs_x, −1)=true && IsSuccess (Replace (Ts, Version (Ts, −1))=true", which is a logical product of "IsSuccess (Replace (Ts, Version (Ts, −1))=true" which is a conditional expression indicating that the test is successful in the previous version, is added.

Figure 28:
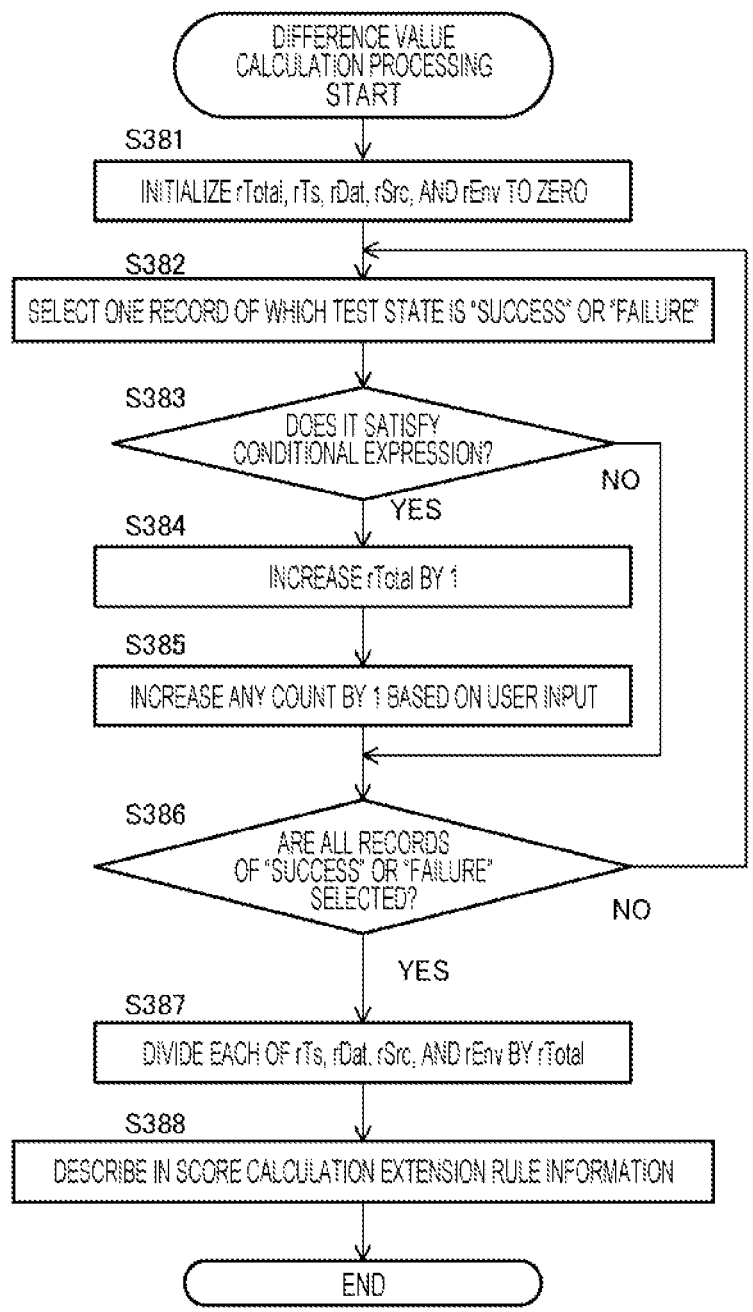
FIG. 28 is a flowchart illustrating details of difference value calculation processing.

FIG. 28 is a flowchart illustrating details of the difference value calculation processing in step S352 of FIG. 25. First, in step S381, the rule generation unit 161 initializes the variables rTotal, rTs, rDat, rSrc, and rEnv to 0. These variables are counters used to count the total number, count Ts, count Dat, count Src, and count Env.

In the subsequent step S382, the rule generation unit 161 selects one record of which the test state 1045 is "Success" or "Failure" from the test execution information 104. Hereinafter, the record selected in this step is referred to as a "selection record". In the subsequent step S383, the rule generation unit 161 refers to the detailed configuration information 114, the detailed related information 115, and the change history information 103 as necessary, and determines whether the condition of the conditional expression in the selection record is satisfied. The rule generation unit 161 proceeds to step S384 when determining that the conditional expression is satisfied, and proceeds to step S386 when determining that the conditional expression is not satisfied. In step S384, the rule generation unit 161 increases the value of the variable rTotal by "1", and in the subsequent step S385, the rule generation unit 161 increases any one value of the corresponding rTs, rDat, rSrc, and rEnv by "1" on the basis of the cause of the failure input by the user, and the process proceeds to step S386.

In step S386, the rule generation unit 161 determines whether all records of which the test state 1045 is "Success" or "Failure" have been selected. When it is determined that all records have been selected, the process proceeds to step S387, and when it is determined that there is a record that has not been selected, the process returns to step S382. In step S387, the rule generation unit 161 divides each of rTs, rDat, rSrc, and rEnv by rTotal. In the subsequent step S388, the rule generation unit 161 describes the calculation result of step S387 in each field of the addition value 1023 of the score calculation extension rule information 102A, and ends the difference value calculation processing.

Figure 29:
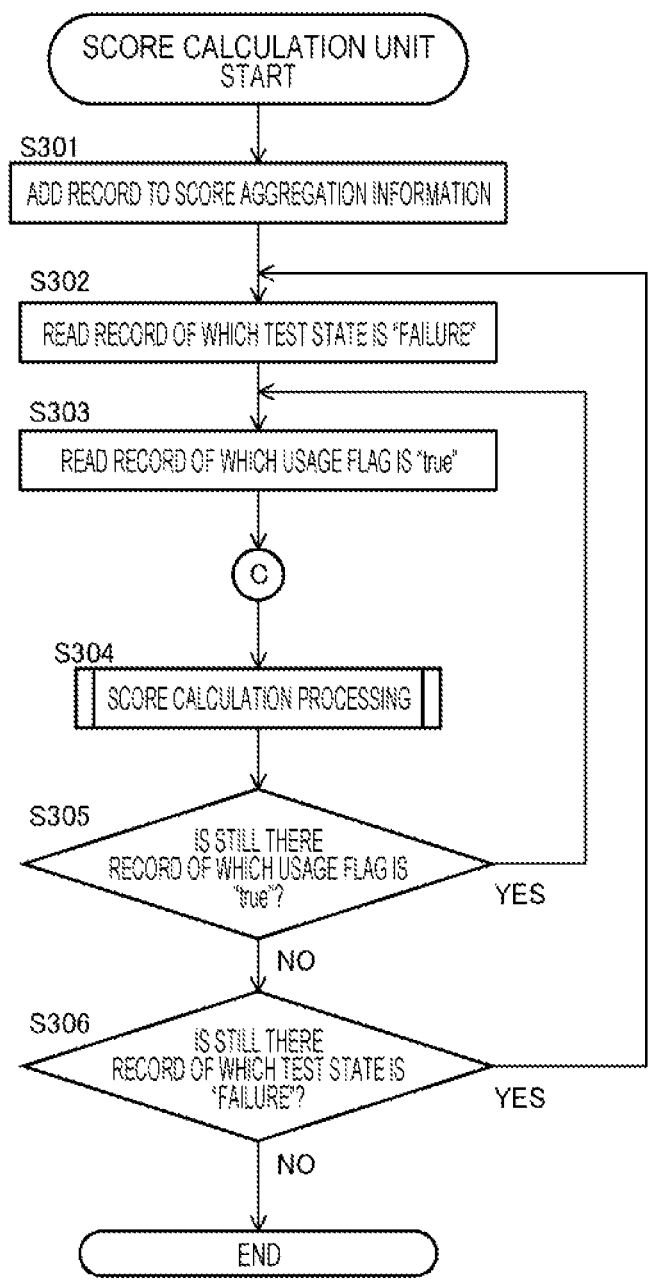
FIG. 29 is a flowchart illustrating processing of a score calculation unit in the second embodiment.
Figure 30:
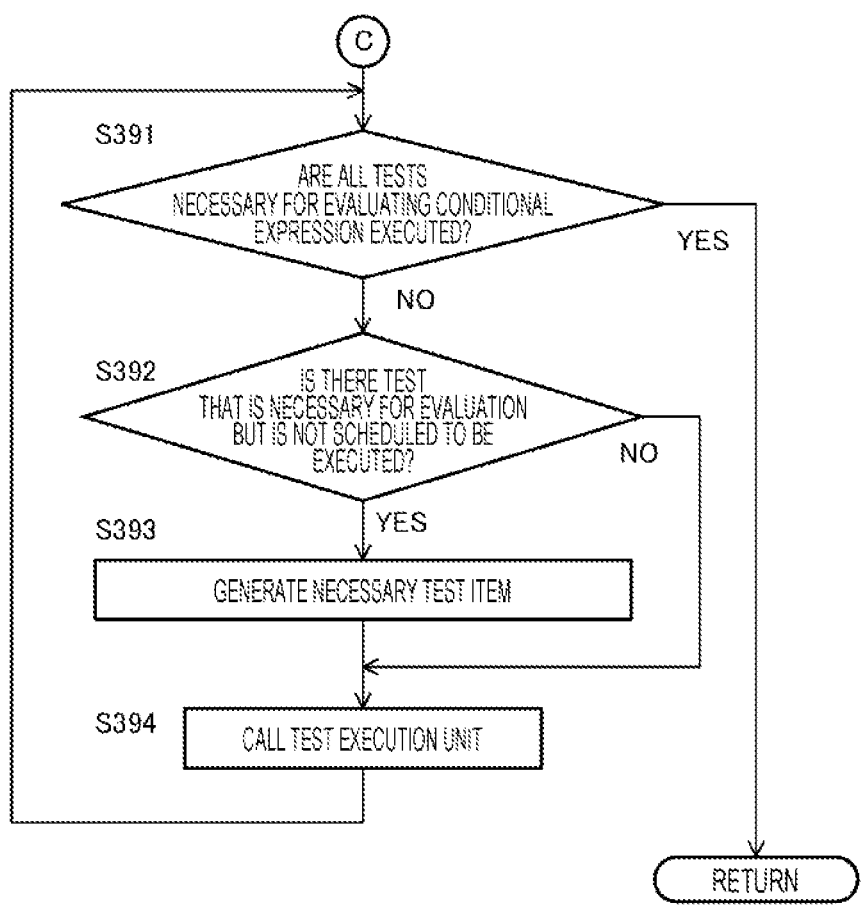
FIG. 30 is a flowchart illustrating processing of a score calculation unit in the second embodiment.

FIGS. 29 and 30 are flowcharts illustrating processing of the score calculation unit 151A in the second embodiment. The difference from the processing illustrated in FIGS. 12 to 13 of the first embodiment is that processing is added between step S303 and step S304. In the present embodiment, when the processing in step S303 is completed, the processing illustrated in FIG. 30 is performed via circle C, and when the processing is completed, the processing in and after step S304 is executed.

In FIG. 30, the score calculation unit 151A determines whether all tests necessary for evaluation of the conditional expression have been executed. In a case where the score calculation unit 151A determines that all the tests have been executed, the processing of FIG. 30 is ended and the process returns to FIG. 29, and in a case where the score calculation unit 151A determines that at least one test necessary for the evaluation of the conditional expression is not completed, the process proceeds to step S392. In step S392, the score calculation unit 151A determines whether there is a test that is necessary for evaluation of the conditional expression but is not scheduled to be executed. In a case where the score calculation unit 151A determines that there is a test that is not scheduled to be executed, the process proceeds to step S393, and in a case where the score calculation unit 151A determines that all necessary tests are scheduled to be executed, the process proceeds to step S394.

In step S393, the score calculation unit 151A causes the test addition execution unit 162 to generate a test item for executing a test that is necessary for evaluation of the conditional expression and is not scheduled to be executed, and proceeds to step S394. At this time, the test addition execution unit 162 adds a new record in which the priority 1044 is set to "High" to the test execution information 104. In step S394, the score calculation unit 151A calls a test execution unit (not illustrated), waits for a predetermined time standby time, and then returns to step S391. The processing illustrated in FIG. 30 has been described above. Note that, in this flowchart, the score calculation unit 151A calls the test execution unit, but the test addition execution unit 162 may call the test execution unit.

The test execution unit executes a test according to the description of the test execution information 104. However, since the execution content of the actual test is described in the corresponding test script Ts, the detailed description of the operation of the test execution unit is omitted.

Figure 31:
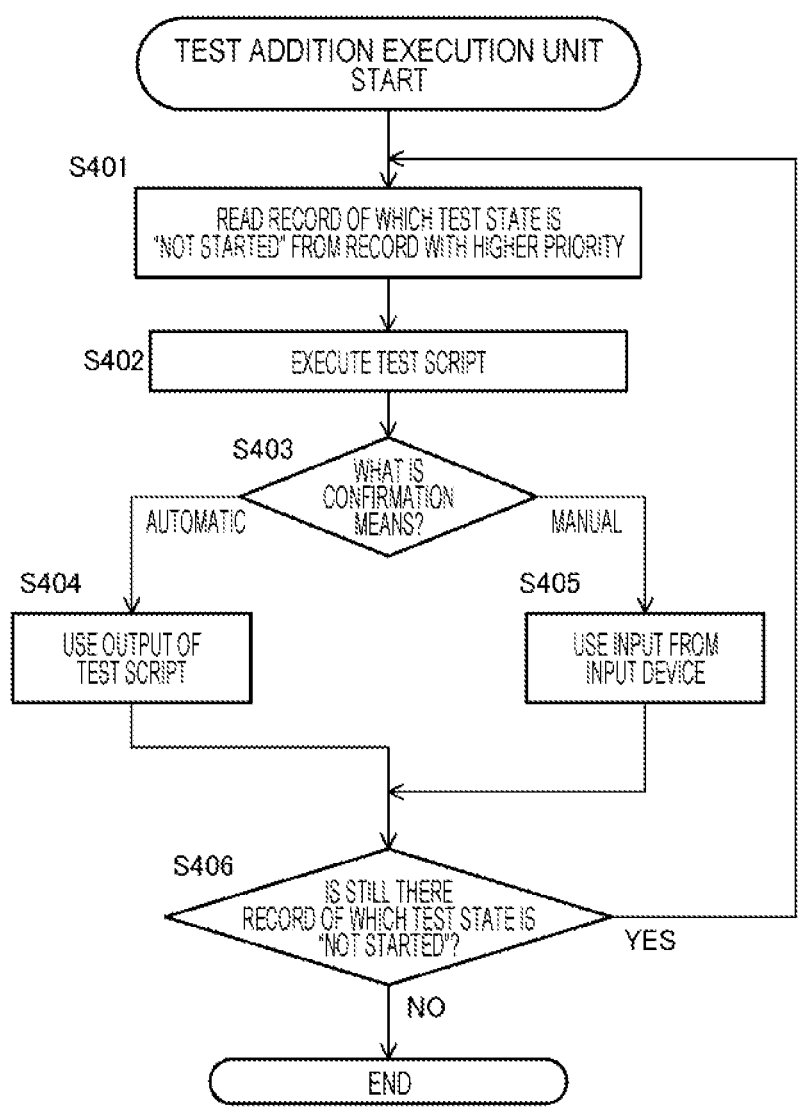
FIG. 31 is a flowchart illustrating processing of a test addition execution unit.

FIG. 31 is a flowchart illustrating processing of the test addition execution unit 162. In step S401, the test addition execution unit 162 reads one record in which the test state 1045 is "Not started" in the test execution information 104 from the record with the higher priority 1044. The record read in this step is referred to as an "execution record" in the following description of this flowchart. In the subsequent step S402, the test addition execution unit 162 executes the corresponding test script in order to execute the test of the execution record read in step S401. For example, when a record having a test execution ID of "E3" in FIG. 7 is read, a test script having a configuration ID of "K2" and a version of "V1" is executed.

In the subsequent step S403, the test addition execution unit 162 refers to the extended test case information 101A and determines whether the value of the confirmation 1013 of the test to be executed is "Automatic" or "Manual". The test addition execution unit 162 proceeds to step S404 when determining that the confirmation 1013 is "Automatic", and proceeds to step S405 when determining that the confirmation 1013 is "Manual". In step S404, the test addition execution unit 162 records the test result output by the test script, that is, "Success" or "Failure" in the test state 1045 of the execution record in the test execution information 104, and proceeds to step S406.

In step S405, the test addition execution unit 162 records the test result in the test state 1045 of the execution record in the test execution information 104 on the basis of the input from the input device by the user, and proceeds to step S406. In step S406, the test addition execution unit 162 determines whether there is a record whose test state 1045 is "Not started". The test addition execution unit 162 returns to step S401 when determining that there is a record of "Not started", and ends the processing illustrated in FIG. 31 when determining that there is no record of "Not started".

According to the second embodiment described above, the following operational effects can be obtained.

(4) The conditional expression 1022 relates to a change in the detailed components which are the components of the test target software Src, the test data Dat, the test script Ts, and the test environment Env, a dependence relationship between the detailed components, and a similarity relationship between the detailed components. Therefore, the analysis device 1 can specify the cause of the failure from a plurality of viewpoints.

(5) The analysis device 1A further includes a rule generation unit 161 that adds, to the score calculation extension rule information 102A, a new conditional expression in which each of the test target software Src, the test data Dat, the test script Ts, and the test environment Env in the conditional expression of the score calculation rule information is replaced with a detailed component. This process is illustrated in steps S361 to S362 in FIG. 26. Therefore, it is not necessary for the user to prepare all the score calculation rule information 102 as in the first embodiment.

(6) As illustrated in S363 to S365 in FIG. 26, the rule generation unit 161 further adds a new conditional expression based on the relationship between the detailed components. Therefore, it is not necessary for the user to prepare all the score calculation rule information 102 as in the first embodiment.

(7) As illustrated in S371 to S376 of FIG. 27, the rule generation unit 161 generates a new conditional expression in which the time or version included in the conditional expression of the score calculation extension rule information 102A is changed, and adds the new conditional expression to the score calculation extension rule information 102A. Therefore, it is not necessary for the user to prepare all the score calculation rule information 102 as in the first embodiment.

(8) The analysis device 1A includes a test addition execution unit 162 that newly generates and executes a test item necessary for evaluating the conditional expression 1022. Therefore, it is possible to additionally execute a test necessary for evaluating the conditional expression.

In the above-described embodiments and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

The above-described embodiments and modifications may be combined with each other. Various embodiments and modifications have been described, but the present invention is not limited to these contents. Other aspects which are conceivable within a scope of technical ideas of the present invention may be made within the scope of the present invention.

REFERENCE SIGNS LIST 1, 1A analysis device
84 storage unit
85 input/output interface
101 test case information
101A extended test case information
102 score calculation rule information
102A score calculation extension rule information
103 change history information
104 test execution information
105 score aggregation information
105A extended score aggregation information
106 name correspondence information
151, 151A score calculation unit
152 estimation unit
153, 153A display generation unit
161 rule generation unit
162 test addition execution unit
163 priority change unit
164 failure cause correction unit

The invention claimed is:

1. An analysis device that specifies a cause when a test of test target software fails in a test environment that is an environment for executing a test, wherein in the test, execution of test target software and confirmation of an execution result are executed by a test script without human intervention, test data is data read into the test target software and the test script when the test is executed, and the analysis device comprises:
a score calculation unit that calculates a failure cause score for each of test target software, test data, a test script, and a test environment based on a presence or absence of a change; and
an estimation unit that estimates, based on a failure cause score, whether the test has failed due to test target software, test data, a test script, or a test environment; and
a storage unit that stores score calculation rule information including a plurality of combinations of a conditional expression and an addition value of the failure cause score added in a case where the conditional expression is satisfied,
wherein the conditional expression relates to a change of a detailed component which is a component of each of test target software, test data, a test script, and a test environment, a dependence relationship between the detailed components, and a similarity relationship between the detailed components.

2. The analysis device according to claim 1, further comprising
a storage unit that stores score calculation rule information including a plurality of combinations of a conditional expression and an addition value of the failure cause score added in a case where the conditional expression is satisfied,
wherein the score calculation unit calculates the failure cause score based on the score calculation rule information, and
the analysis device comprises:
a display generation unit that generates video information including the failure cause score and information indicating the conditional expression used to calculate the failure cause score; and
an input/output interface that outputs the video information generated by the display generation unit to a display unit.

3. The analysis device according to claim 1, further comprising a rule generation unit that adds, to the score calculation rule information, a new conditional expression in which each of test target software, test data, a test script, and a test environment in the conditional expression of the score calculation rule information is replaced with the detailed component.

4. The analysis device according to claim 3, wherein the rule generation unit further adds a new conditional expression based on a relationship between the detailed components.

5. The analysis device according to claim 3, wherein the rule generation unit generates a new conditional expression in which a time or a version included in the conditional expression of the score calculation rule information is changed, and adds the new conditional expression to the score calculation rule information.

6. The analysis device according to claim 1, further comprising a test addition execution unit that newly generates and executes a test item necessary for evaluating the conditional expression.

7. An analysis method for causing a computer to specify a cause when a test of test target software fails in a test environment that is an environment for executing a test, wherein in the test, execution of test target software and confirmation of an execution result are executed by a test script without human intervention, test data is data read into the test target software and the test script when the test is executed, and the analysis method comprises:

calculating a failure cause score for each of test target software, test data, a test script, and a test environment based on a presence or absence of a change; and estimating, based on a failure cause score, whether the test has failed due to test target software, test data, a test script, or a test environment; and storing score calculation rule information including a plurality of combinations of a conditional expression and an addition value of the failure cause score added in a case where the conditional expression is satisfied, wherein the conditional expression relates to a change of a detailed component which is a component of each of test target software, test data, a test script, and a test environment, a dependence relationship between the detailed components, and a similarity relationship between the detailed components.

* * * * *